June 17, 1930.  S. MADSEN  1,764,965
STRAIGHT LINE OVERHEAD CUT-OFF SAW
Filed April 25, 1928   2 Sheets-Sheet 1
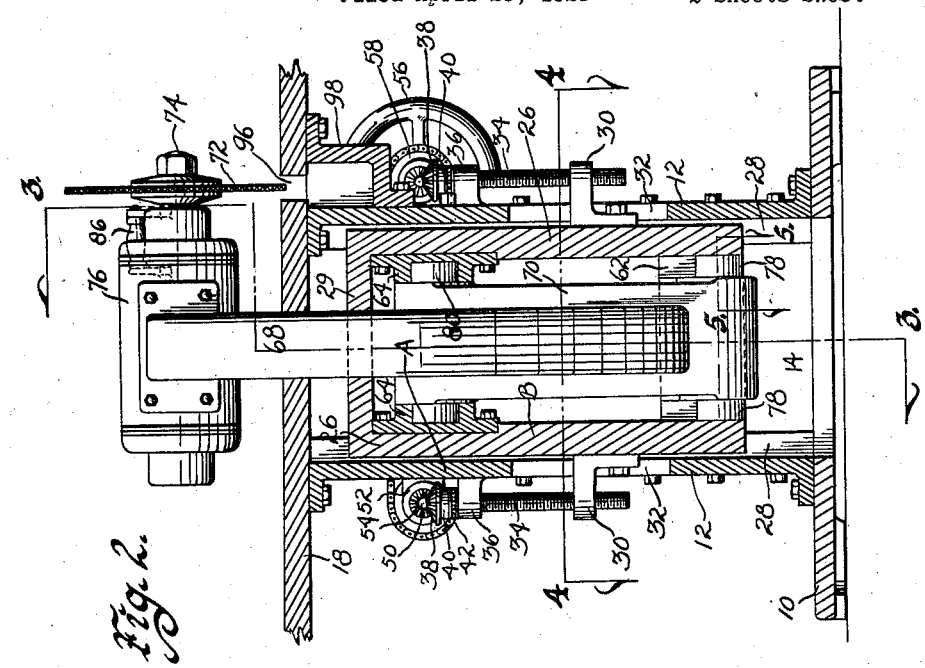
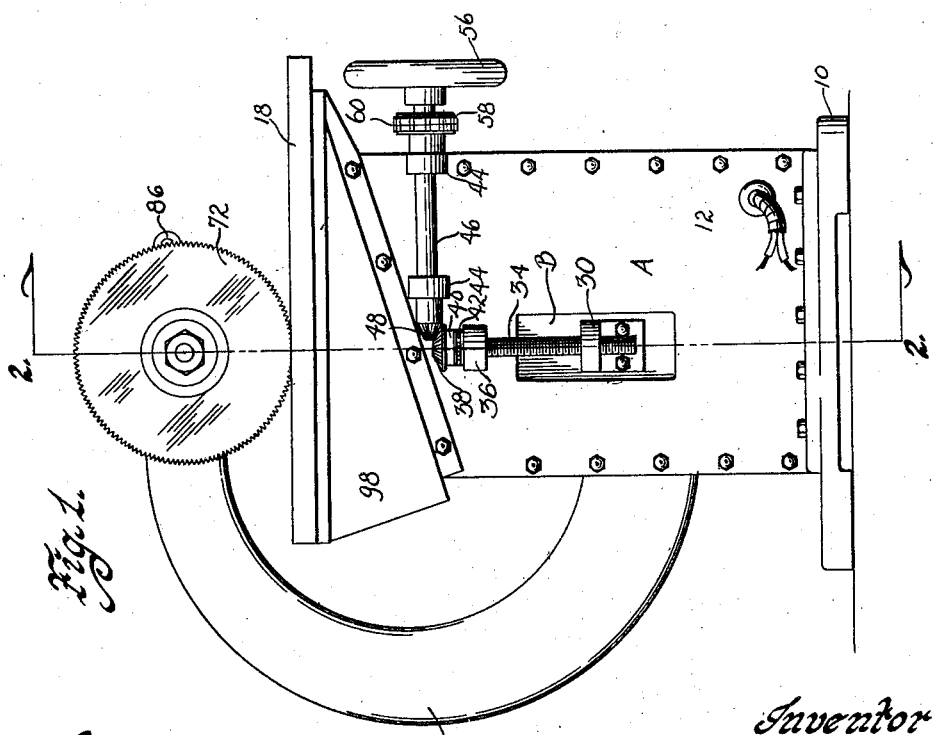

June 17, 1930. S. MADSEN 1,764,965
STRAIGHT LINE OVERHEAD CUT-OFF SAW
Filed April 25, 1928 2 Sheets-Sheet 2
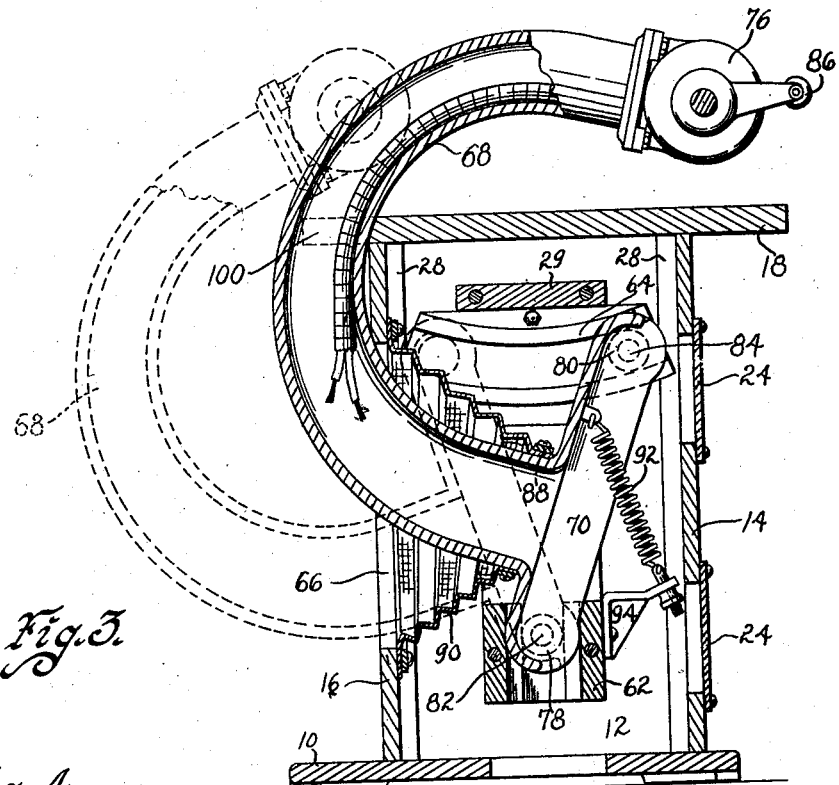
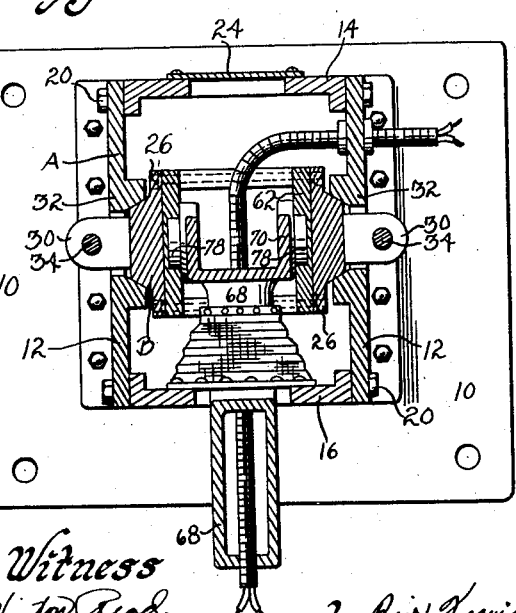
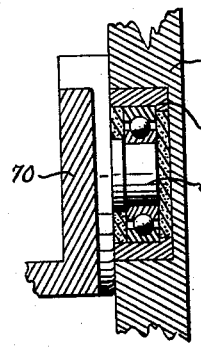
Inventor
Sern Madsen
By Bair, Freeman & Sinclair Attorneys
Witness
Vinton Read Patented June 17, 1930

1,764,965

UNITED STATES PATENT OFFICE

SERN MADSEN, OF CLINTON, IOWA, ASSIGNOR TO CURTIS COMPANIES, INCORPORATED, OF CLINTON, IOWA

STRAIGHT-LINE OVERHEAD CUT-OFF SAW

Application filed April 25, 1928. Serial No. 272,693.

My present invention has to do with improvements in the construction and arrangement of a cut-off saw and its mounting and bench, and has for its purpose to provide a bench, a cut-off saw and a mounting for the saw, so constructed and arranged that the saw may travel in a straight line parallel with the top of the saw bench above the surface of the bench.

Another purpose is to provide such a mounting as will permit the useful stroke of the saw to have maximum length.

In making such a saw, saw bench and mounting, it is my purpose to provide a number of certain important advantages, which are here set forth.

It is my purpose for example to provide guiding and supporting elements for the saw carrying arm or means arranged below the saw bench and preferably within the enclosed base thereof.

Thus it is my purpose to provide the single unit structure in which the saw bench and saw and saw mounting are assembled as a unit and can be moved from place to place as a unit.

Another object of such a construction is to provide a saw and saw bench, which will use a minimum of floor space.

Another object is to house the saw supporting and guiding elements in the bench casing below the top of the bench, so that the sliding or guiding mechanism may be protected from dust and dirt and so located as to involve the greatest freedom from possibilities of accident.

Another purpose is to provide such a structure in which the saw itself is carried by an arm from the sliding and moving mounting in such manner that the arm can be used for carrying wires for supplying current to a motor mounting on the saw arbor.

Still another purpose is to provide a structure of the kind mentioned having a minimum number of moving parts subject to wear.

Another object is to provide such a structure in which the saw mounting is so constructed and arranged as to permit the manipulation of the saw with a minimum of effort, so that the fatigue of the operator may be reduced to the lowest limit.

With these and other objects in view, my invention consists in the construction, arrangement and combination of the various parts of my structure, whereby the objects contemplated are attained, as hereinafter more fully set forth, pointed out in my claims, and illustrated in the accompanying drawings, in which:

Figure 1 shows a side elevation of a cut-off saw structure embodying my invention.

Figure 2 is a detail, sectional view taken on the line 2—2 of Figure 1.

Figure 3 is a detail view partly in section taken on the line 3—3 of Figure 2.

Figure 4 is a horizontal, sectional view taken on the line 4—4 of Figure 2; and

Figure 5 is a detail, sectional view taken on the line 5—5 of Figure 2.

Heretofore many cut-off saws have been made. Nearly all of them are subject to some objection. If the cut-off saw is hung from the ceiling or from a wall, or on a floor stand separate from the wall, it is difficult to keep the saw and the saw bench at proper relative heights.

If a truck load of lumber is moved up to the saw bench, there is likely to be enough sag in the floor to cause the bench to sag away a little from the saw, and to require adjustment and perhaps readjustment as the load on the truck is moved, operated on, and carried away.

Where saws have been mounted on the saw bench, it has been difficult to give them the full stroke or easy motion.

It is difficult to get the straight-line action and difficult to keep the top of the bench cleared.

It is difficult to avoid multiplicity of joints in exposed places. These difficulties, I have sought to avoid in my present structure.

In my improved structure, I have shown in my drawings a base plate indicated by the reference numeral 10.

Extending upwardly from the base plate 10 are the side walls 12, front wall 14, and rear wall 16 of an enclosed base frame. This frame forms a part of what is ordinarily called the saw bench, but for convenience, I shall apply the term "saw bench" to the platform or bench member 18 resting on the frame just described.

It will be understood that the frame members 12, 14 and 16 are bolted together as by cap screws 20, and that access may be had to the interior of the base frame by the removal of suitable plates 24, such for instance as illustrated in Figure 4.

On the interior of the base frame is mounted a vertically adjustable cage. For convenience, I have marked the base frame with the reference character A and the cage just mentioned with the character B.

The cage B comprises spaced upright side members 26 mounted in vertical guideways 28 in the wall members 12. These members 26 are connected at their ends by a rigid member 29 (see Figure 2). The cage formed by the members 26 and 29 is arranged to be vertically adjustable in the guideways 28.

Each member 26 has a lug or ear 30 projecting outwardly through a vertical, elongated slot 32 in the adjacent frame member 12 as shown in Figure 2.

Rods 34 have screw-threaded connection with the respective lugs 30 as shown in Figure 2 and are journaled rotatably in lugs 36 on the members 12 above the slots 32.

On the upper ends of the rods 34 are beveled gears 38 having hubs 40. Between the hubs 40 and the lugs 36 are ball bearings 42 (see Figure 2).

Mounted on one of the members 12 in bearings 44 is an operating shaft 46 on which is a beveled gear 48 meshing with one of the beveled gears 38, as shown in Figure 1.

Supported on the other end of the other member 12 is a similar shaft 50 in bearings 52. On the shaft 50 is a beveled gear 54 in mesh with the other beveled gear 38.

On the shaft 46 is an operating hand-wheel 56, and the shafts 46 and 50 are operatively connected by means of sprockets 58 and a sprocket chain 60.

By rotating the hand wheel 56, the members 26 may be raised or lowered for carrying with them the cut-off saw and its mounting arm, which will now be described.

Cut-off saw mounting

Referring to Figures 1, 2 and 3, it will be observed that there are arranged at the lower part of the members 26 spaced vertical guides 62. At the upper end of the members 26 on the inner faces of the respective ends of said members are arranged channel-shaped curved guides 64.

In the rear wall 16 of the base frame A is a vertically elongated opening 66.

I provide a saw arm 68, which is preferably hollow and is bent on the arc of a circle and in length is about half a circle.

One end of the arm 68 projects through the hole 66 as shown in Figure 3 and is provided with a cross arm 70. The saw arm 68 stands in a vertical plane, as does the cross arm 70. The lower end of the cross arm 70 projects below the arm 68. The upper end of the arm 68 carries a saw 72 on a saw arbor 74, which is also the shaft of the motor 76.

The lower end of the cross arm 70, as shown in Figures 2 and 3, carries at its opposite sides the rollers 78 traveling between the guides 62.

The upper end of the cross arm 22 carries the rollers 80 traveling in the guides 64. The rollers 78 and 80 are preferably mounted on shafts 82 and 84.

Preferably the distance between the shafts 82 and 84 is the same as the distance between the shafts 84 and 74.

The arm 68 is connected with the cross arm 70. The upwardly extending part of the arm 70 is nearly three times as long as the downwardly extending part in the particular form of the machine here shown.

It will be noted also that the shafts 82, 84 and 74 are in line.

The guides 64 are curved on the arcs of circles, which would have their centers at the axis line of the shaft 74 when the parts are swung to position where the shaft 74 is vertically in alignment above the axis of the rollers 78.

A handle 86 projects from the motor for the convenient swinging of the saw.

On the arm 68 is a collar 88, which is connected by a canvas bellows or the like 90 with the edge of the frame member 16 around the hole 66 to keep dust from the interior of the base frame A.

A coil spring 92 may be connected with the arm 70 and a suitable bracket 94. The coil spring 92 is necessary to act as a counter balance for the weight of the arm 68 and the motor 76. The dotted line position in Figure 3 illustrates the necessity of a counterbalancing device as the arm and motor considerably overhang their point of support when the saw is in its fully retracted position. At such time the spring 92 would exert its greatest tension as its maximum point of extension would be reached. Any other suitable counter-balancing device may be employed.

The bench 18 may be provided with a slot 96 below the saw 72 and a trough 98 may be provided below the slot for connection with a vacuum dust take-off pipe.

The bench 18 may be provided with a slot 100 to receive the arm 68.

In the practical use of my improved cut-off saw, the motor may be started for rotating the saw and the saw may be swung across the bench for cutting stock resting on the bench.

On account of the peculiar shape and arrangement of the guides, rollers and parts, the saw will travel in a horizontal line. It may be raised or lowered for short distances by means of the hand wheel 56 and connected parts for adjusting for use with different stock.

It will be seen from the foregoing that I have provided a peculiar mounting for the cut-off saw, which has a number of advantages.

The saw is mounted on the bench structure in such a way that no sag in the floor will effect any variation in the relation of the saw to the table or bench top.

The saw is supported in such a way that the supporting mechanism is below the bench and within the base frame protected from dust and dirt and there is a minimum interference with the use of the table.

There are no overhanging parts, except the saw and the motor and the one arm 68.

The table is quite clear when the saw is at its rearward limit of movement.

The saw has a maximum swing, because at the center of its swing, it is directly over its lowermost pivot point.

The whole device is a compact unit, which can be moved easily from place to place and occupies minimum floor space.

It is of comparatively simple construction and yet affords enough adjustment for a great variety of work.

One particular advantage arising from the present construction is found in the fact that the wires for the motor may be extended through the arm 68 and thus the current conducting cables are kept out of the way and are protected and do not interfere with the operation of the saw.

I claim as my invention:

1. In a structure of the class described, the combination of a base frame, and a saw bench thereon with a saw, a curved arm, said saw being mounted on one end of said arm, said arm being inclined downwardly and extended into said base frame, a cross arm on the lower end of said saw arm, having its lower end mounted for vertical sliding movement and its upper end mounted for movement in the arc of a circle having its center in the axis of rotation of the saw, when such axis is directly above the lower end of said cross arm.

2. In a structure of the class described, a base frame, a work supporting bench thereon, a curved arm carrying at its upper end a tool and projecting at its lower end into the base frame, a cross arm on the lower end of the curved arm, means for mounting the lower end of the cross arm for vertical sliding movement, means for mounting the upper end of the cross arm for sliding movement in the arc of a circle, whereby the movement of the arms effects horizontal movement of the tool.

3. In a structure of the class described, a base frame, a work supporting bench thereon, a curved arm carrying at its upper end a tool and projecting at its lower end into the base frame, a cross arm on the lower end of the curved arm, means for guiding a point on the lower end of the cross arm for vertical movement and means for guiding a point on the upper end of the cross arm for movement in the arc of a circle, whereby the movement of the arms effects horizontal movement of the tool such guided points and the axis of the tool lying in a straight line.

4. In a structure of the class described, a base frame, a work supporting bench thereon, a curved arm carrying at its upper end a tool and projecting at its lower end into the base frame, a cross arm on the lower end of the curved arm, means for mounting the lower end of the cross arm for vertical sliding movement, means for mounting the upper end of the cross arm for sliding movement in the arc of a circle, whereby the movement of the arms effects horizontal movement of the tool, the cross arm supporting means being vertically adjustable to raise and lower the path of the tool.

5. In a device of the class described, a work supporting bench, a semi-circular arm having its upper end arranged to travel horizontally across the bench and its lower end below the bench, a cross arm on the lower end of the first arm, guide means for the lower end of the cross arm for permitting it to rock on a transverse axis and to reciprocate vertically, guide means for the upper end of the cross arm for permitting it to travel in the arc of a circle having its center above the bench in the extended axis of vertical travel of the lower end of the cross arm, the upper end of the cross arm being mid-way between the lower end thereof and the upper end of the first arm.

6. In a structure of the class described, a saw bench, a cut off saw, a saw supporting arm curved backwardly to entirely clear the bench in all positions of its movement, means for pivotally and slidably mounting the lower end of the arm underneath the bench and means to cause sliding movement thereof to permit the saw to travel in a true horizontal line above the bench when pivotal movement is imparted to the arm.

7. In a cut-off saw structure, a saw bench, a cut-off saw, a saw supporting arm for said saw curved backwardly over the edge of the bench and adapted to entirely clear the bench and the stock being cut from above by the saw in any position of movement thereof, means for pivotally and slidably mounting the lower end of the arm beneath the bench means to cause sliding movement thereof to cause the arm to travel in a line parallel with the top of the bench when pivotal movement is imparted to the arm and means for slidably associating said mounting of the lower end of the arm with the bench for vertical adjustment whereby the distance of the saw from the top of the bench may be varied.

8. In a structure of the class described, a bench having a bench top for supporting work, an arm, a tool supported on the upper end thereof, the lower end of said arm being pivotally and slidably supported by said bench below said bench top, the portion of said arm intermediate the ends thereof extending laterally from beneath the bench top and curved upwardly to clear the bench top and then extending in a reversely lateral direction clear of any work on said bench top being cut by said tool and means to cause sliding movement of the lower end of said arm when pivotal movement is imparted thereto whereby to cause straight line travel of said tool.

Des Moines, Iowa, April 5, 1928.

SERN MADSEN.